(12) United States Patent
Battista

(10) Patent No.: US 7,877,208 B1
(45) Date of Patent: Jan. 25, 2011

(54) SENSOR INTERFACE WITH MOBILE TERMINAL SATELLITE MODEM AND GLOBAL LOCATION SYSTEM

(75) Inventor: Rich Battista, Ashburn, VA (US)

(73) Assignee: SkyBitz, Inc., Sterling, VA (US)

( * ) Notice: Subject to any disclaimer, the term of this patent is extended or adjusted under 35 U.S.C. 154(b) by 1154 days.

(21) Appl. No.: 11/528,577

(22) Filed: Sep. 28, 2006

Related U.S. Application Data

(60) Provisional application No. 60/721,539, filed on Sep. 29, 2005.

(51) Int. Cl.
*G08B 1/00* (2006.01)

(52) U.S. Cl. ........................ 701/213; 342/457

(58) Field of Classification Search ............. 701/213; 340/426.19, 540, 989, 539.26, 10.1, 825.36, 340/825.49, 572.1, 572.3, 572.4, 568.1; 342/457, 342/42, 44, 46
See application file for complete search history.

(56) References Cited

U.S. PATENT DOCUMENTS

| | | | |
|---|---|---|---|
| 5,588,005 A * | 12/1996 | Ali et al. | ..................... 370/346 |
| 5,955,986 A | 9/1999 | Sullivan | |
| 6,094,162 A | 7/2000 | Sullivan | |
| 6,154,171 A | 11/2000 | Sullivan | |
| 6,169,514 B1 | 1/2001 | Sullivan | |
| 6,243,648 B1 | 6/2001 | Kilfeather et al. | |
| 6,480,788 B2 | 11/2002 | Kilfeather et al. | |
| 6,553,336 B1 * | 4/2003 | Johnson et al. | ............. 702/188 |
| 6,560,536 B1 | 5/2003 | Sullivan et al. | |
| 6,725,158 B1 | 4/2004 | Kilfeather et al. | |
| 6,919,803 B2 | 7/2005 | Breed | |
| 7,265,668 B1 | 9/2007 | Brosius | |
| 7,525,432 B2 * | 4/2009 | Jackson | ................... 340/572.1 |

* cited by examiner

*Primary Examiner*—Dalena Tran
(74) *Attorney, Agent, or Firm*—Duane S. Kobayashi

(57) ABSTRACT

A system and method for implementing a low-power local-area network for use with a mobile terminal satellite modem. This low-power local-area network enables sensors on an asset to transmit sensor data to a mobile terminal affixed on the asset. The mobile terminal reports the sensor data along with asset position information to a centralized facility via a communications satellite.

16 Claims, 3 Drawing Sheets

SENSOR INTERFACE WITH MOBILE TERMINAL SATELLITE MODEM AND GLOBAL LOCATION SYSTEM

This application claims priority to provisional application No. 60/721,539, filed Sep. 29, 2005, which is incorporated herein by reference in its entirety.

BACKGROUND

1. Field of the Invention

The present invention relates generally to asset tracking and monitoring and, more particularly, to a sensor interface with mobile terminal satellite modem and global location system.

2. Introduction

Tracking mobile assets represents a growing enterprise as companies seek increased visibility into the status of a service fleet (e.g., long-haul delivery fleet). Visibility into the status of a service fleet can be gained through mobile terminals that are affixed to service vehicles. These mobile terminals can be designed to generate position information that can be used to update status reports that are provided to customer representatives.

In providing status reports to a centralized facility, the mobile terminal can generate position information through the reception of satellite position signals such as that generated by the GPS satellite network. Generated status reports are transmitted to the centralized facility using a return link via a communications satellite.

In various embodiments, the status reports can also include sensor data that is generated by sensors affixed to the service vehicle (e.g., inside a trailer). This sensor data would enable the company to discern the condition of cargo being transported, the condition of the service vehicle, the occurrence of any events at the service vehicle, etc.

Sensor data can be obtained using sensors that are positioned at various points on a service vehicle. Connection of this collection of sensors to the mobile terminal can represent a substantial expense. Accordingly, what is needed is a mechanism that reduces the costs of obtaining such sensor data, while also minimizing the overall power required by the monitoring system.

SUMMARY

A system and/or method for implementing a sensor interface, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
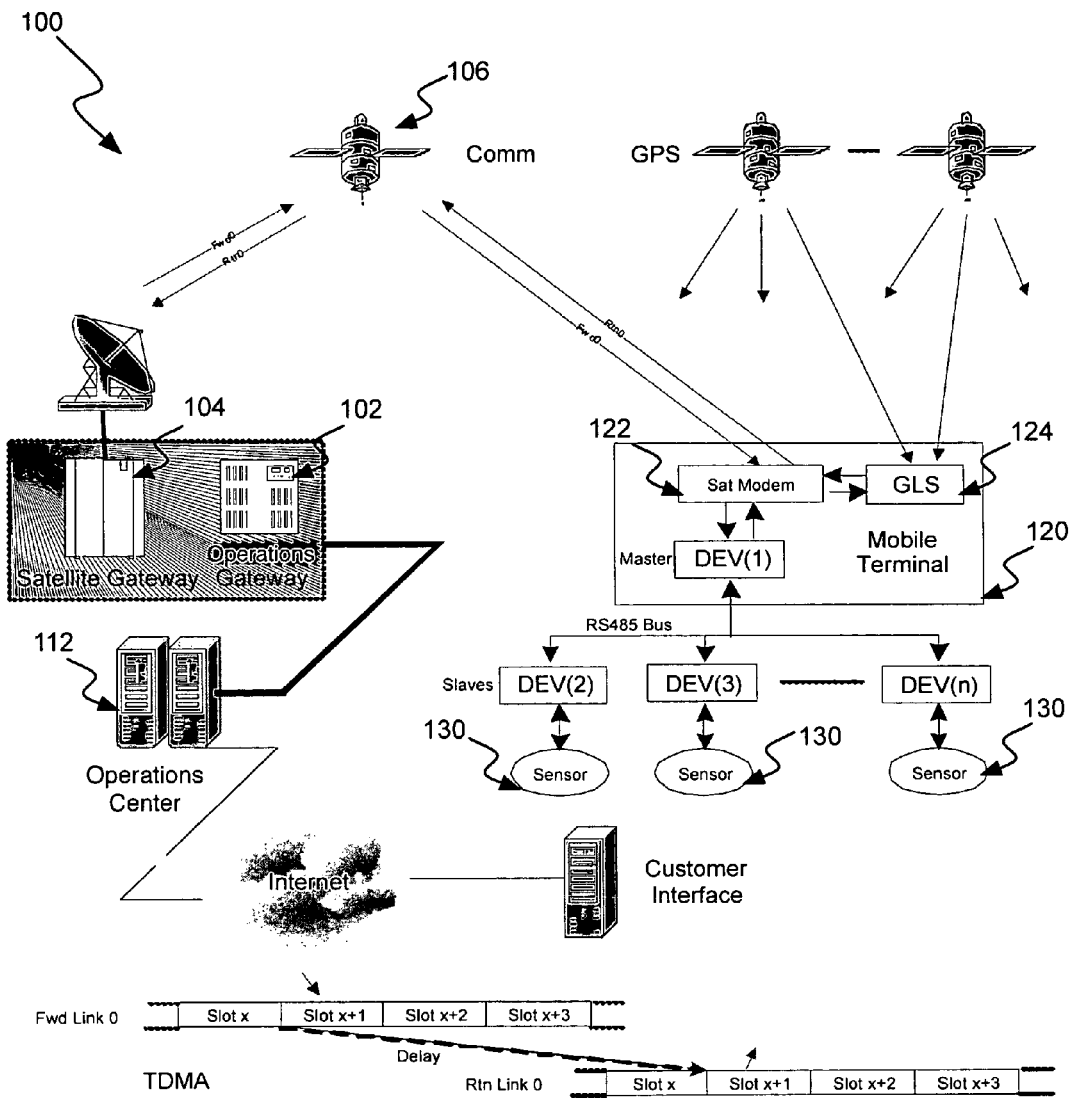
FIG. 1 illustrates an embodiment of a satellite communications network that enables the monitoring of remote assets using a collection of sensors.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Conventional asset tracking systems have been used to track the positions of assets. This position information can be relayed via satellite to a centralized facility that is responsible for reporting the current and historical positions of those assets. In meeting the demand by customers for greater visibility into the status of the assets, the asset-tracking system can also include one or more sensors that are affixed to those assets. Various sensor types can be used. For example, volume sensors, temperature sensors, chemical sensors, radiation sensors, weight sensors, light sensors, water sensors, etc. can be used to report the condition of cargo being transported. In another example, truck cab ID indicators, odometer sensors, wheel sensors, vibration sensors, etc. can be used to report the condition of the service vehicle. In general, these various sensors can be used to report status information or the occurrence of any events at the service vehicle.

Mounting one or more sensors within a trailer is especially valuable when considering the cargo that is being transported. These sensors can provide valuable information relating to the existence, condition of, and access to such cargo. For this reason, significant efforts have been made to capture and report sensor data to a centralized facility.

To enable the reporting of sensor data along with position information, sensors need an interface to a mobile terminal that reports the position and sensor information via wireless communication (e.g., satellite communication) to a centralized facility. The interface between the sensors and the mobile terminal represents a significant technical challenge. This is especially true when considering the range of manufacturers that can supply the various sensors that can be incorporated within the asset tracking system.

Consider, for example, an implementation where a mobile terminal installation is designed to report information generated by a volume sensor, a chemical sensor, and a light sensor. Each of these different sensors can be produced by different manufacturers. Typically, each manufacturer uses a proprietary communication interface to their sensor device. Integration of these devices would therefore require customized interfaces to the mobile terminal. Such a custom installation would be impractical in meeting the range of needs in the asset-tracking marketplace.

It is a feature of the present invention that the connection between the various sensor devices and the mobile terminal can be based on a standardized electrical interface. In one embodiment, this standardized electrical interface is a serial interface such as the bi-directional half-duplex RS-485 interface. Each device can be easily configured to implement the local network protocol by embedding software that contains a set of APIs for the device to use.

By incorporating such a standardized interface into the sensor devices, a market can be created wherein sensors from various manufacturers can be paired with the mobile terminal over a shared communication bus. This reduces the complexity of any given asset tracking installation by allowing an asset tracking service provider to mix and match devices with a given mobile terminal. This flexibility enables the service provider to customize installations for specific customer needs with minimal design costs and testing programs.

As noted, implementing connections between a mobile terminal and one or more sensors affixed to the tracked asset can require significant cost and/or development issues. The principles of the present invention are designed to meet these needs by not only implementing a standardized communication interface between a mobile terminal and one or more sensors that facilitates two-way communication, but also operating such a communication interface in a manner that minimizes the power required by the mobile terminal and the sensor devices.

Prior to describing the details of the principles of the present invention, a description of an embodiment of an operational context is first provided. FIG. 1 illustrates an embodiment of a satellite network 100 that includes operations gateway 102, communicating with mobile terminal 120 on an asset. Communication between operations gateway 102 and mobile terminal 120 is facilitated by satellite gateway 104 at the ground station and satellite modem 122 in mobile terminal 120. Both satellite gateway 104 and satellite modem 122 facilitate communication using one forward and one return link (frequency) over communications satellite 106.

In one embodiment, the satellite communication is implemented in a time division multiple access (TDMA) structure, which consists of 57600 time slots each day, per frequency or link, where each slot is 1.5 seconds long. On the forward link, operations gateway 102 sends a message or packet to mobile terminal 120 on one of the 1.5 second slots. Upon receipt of this message or packet, mobile terminal 120 would then perform a GPS collection (e.g., code phase measurements) using Global Locating System (GLS) module 124 or to perform sensor measurements and transmit the data back to operations gateway 102 on the return link, on the same slot, delayed by a fixed time defined by the network. In one embodiment, the fixed delay defines a length of time that enables mobile terminal 120 to decode the forward packet, perform the data collection and processing, and build and transmit the return packet. For example, time offsets between forward and return timeslots can extend from 3 to 12 seconds or more, depending on system needs.

In one embodiment, mobile terminal 120 can be configured to produce periodic status reports. In this configuration, mobile terminal 120 would wake up periodically, search for its assigned forward slot, perform data collection and processing, and transmit the status report on the assigned return slot. In another embodiment, mobile terminal 120 can be configured to produce a status report upon an occurrence of an event (e.g., door opening, motion detected, sensor reading, etc.). In this configuration, mobile terminal 120 would wake up upon occurrence of an event, search for an available forward slot, perform data collection and processing, and transmit the status report on the return slot corresponding to the identified available forward slot.

Upon receipt of a status report from mobile terminal 120, operations gateway 102 passes the information to operations center 112, where the information is processed and passed to a customer via the Internet. A detailed description of this communications process is provided in U.S. Pat. No. 6,725,158, entitled "System and Method for Fast Acquisition Position Reporting Using Communication Satellite Range Measurement," which is incorporated herein by reference in its entirety. As would be appreciated, the principles of the present invention can also be applied to other satellite communications systems as well as to terrestrial communications systems.

As FIG. 1 further illustrates, mobile terminal 120 can also collect sensor measurements from sensors 130 that are positioned at various points on the asset being tracked. Transmission of sensor information from sensors 130 to mobile terminal 120 is facilitated by a shared communication bus. In one embodiment, the shared communication bus is an RS-485 communication bus.

As illustrated, the communication interface uses device DEV(1) that is coupled to satellite modem 122, and devices DEV(2)-DEV(n) that are coupled to respective sensors 130. The local network formed by devices DEV(1)-DEV(n) enables mobile terminal 120 to interface to the plurality of sensors 130. It should be noted that this network can operate independently from the standard functions of mobile terminal 120.

In one embodiment, device DEV(1) is integrated on the same hardware as satellite modem 122. In an alternative embodiment, device DEV(1) is on separate hardware from satellite modem 122 and uses a hardwired interface such as a serial communications interface to communicate with satellite modem 122.

In one embodiment, devices DEV(1)-DEV(n) can be configured as master or slave devices. For example, device DEV(1) in mobile terminal 120 can be configured as a master device, while devices DEV(2)-DEV(n) that are coupled to individual sensors can be configured as slave devices. In general, the master device can be responsible for controlling all other slave devices and organizing data flow, while the slave devices would respond to requests from the master device. This master-slave configuration enables independent communication between the devices. For example, a master device DEV(1) can be designed to poll individual devices DEV(2)-DEV(n) on the bus for information from an attached sensor.

Each device can be an independently addressable unit having its own processor, power management, and other apparatus that allows it to perform data communications, conserve power and reduce cost. It is a feature of the present invention that the bi-directional communication interface has the capability to transfer binary data in both directions to and from a sensor device. In one embodiment, slave devices only transmit in acknowledgment from a request from a master device. For example, slave devices can monitor the communication bus to determine which messages on the bus are directed to themselves. If a slave device identifies its address on the bus, then the slave device can process the message and return a response to the master device. This type of half-duplex communication exhibits good performance in low data rate systems and for avoiding collisions.

Figure 2:
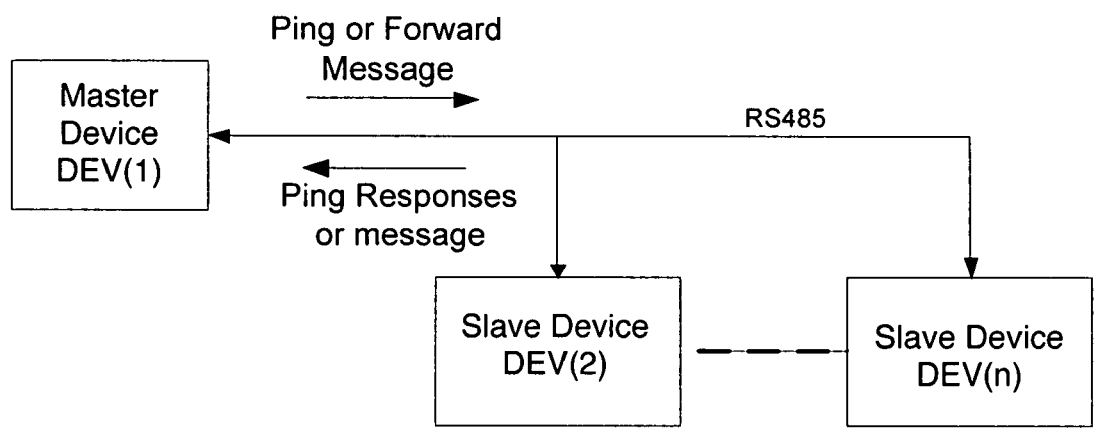
FIG. 2 illustrates an example master slave configuration.

FIG. 2 illustrates an example of a master-slave configuration. In one embodiment, on every wakeup, whether scheduled or awakened by one of slave devices DEV(2)-DEV(n), master device DEV(1) can be configured to ping each slave device DEV(2)-DEV(n). The response can be either a ping response if the slave device has no data to send, or a message response if the slave device does have data. In one embodiment, each slave device can have a default time (e.g., 50 ms) to start sending a response before the master device times out and pings the next device. These default times can be configurable over the air to address particular devices that are slower to respond. For example, devices from one manufacturer can be designed to a different response specification as compared to devices from another manufacturer.

Figure 3A:
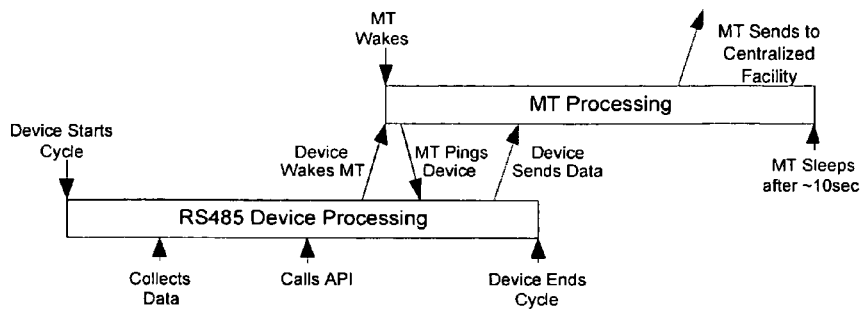
FIGS. 3A-3C illustrate example scenarios where a sensor device can send data to the mobile terminal device.
Figure 3B:
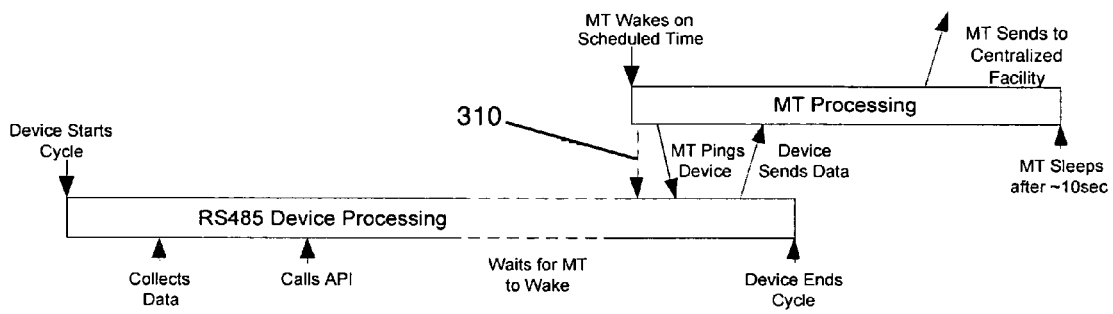
Figure 3C:
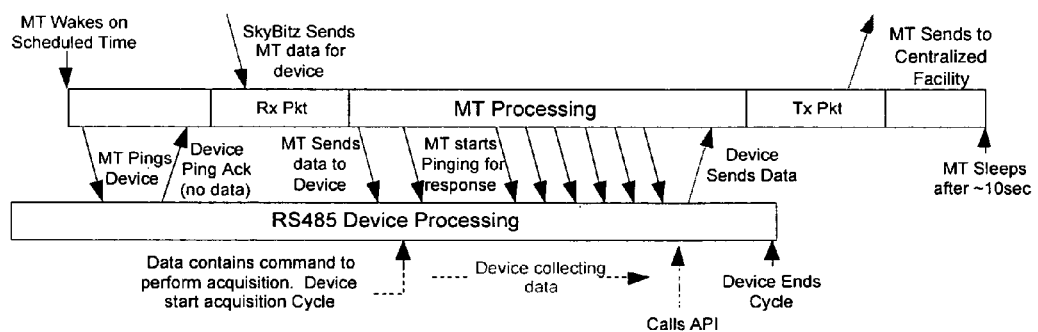

FIGS. 3A-3C illustrate three example scenarios where a sensor device can send data to the mobile terminal device. In the first scenario, the sensor device (e.g., DEV(2)) awakens the mobile terminal device DEV(1). This can occur, for example, upon the occurrence of a sensor event (e.g., alarm detected, door opening, etc.). This sensor event can represent a detected change in monitored status (e.g., door opening, emptying of cargo, change in temperature, etc.), a detected change in operating state, or any other change detectable by a sensor. Information reflective of this detected event or associated with this detected event can then be prepared for transmission to the mobile terminal device by the sensor device, wherein the sensor device awakens the mobile terminal device for delivery of the sensor event data.

In one embodiment, the sensor device uses a wakeup line on the RS-485 bus to alert the mobile terminal that new sensor data is available for transmission to the centralized facility. In particular, the RS-485 bus can incorporate a wake-up line that enables a first device to signal for a second device to wake up from a low power sleep mode. For example, the master device DEV(1) can signal to slave device DEV(2) to wake up. Conversely, device DEV(2) can signal to device DEV(1) to wake up.

After the mobile terminal device wakes up, the mobile terminal device pings the sensor device. The sensor device would then collect data from an attached sensor. In one embodiment, this data collection is facilitated by a hardwired interface, such as a serial interface. In an alternative embodiment, the sensor is integrated with the sensor device.

The sensor device then responds by sending the collected data to the mobile terminal device. The mobile terminal device then forwards the data to satellite modem 122. Satellite modem 122 would then transmit the data to satellite gateway 104 via satellite 106. In one embodiment, satellite modem 122 also transmits position information along with the sensor data. The sensor data can then be made available to the customer over a customer interface via the Internet. As illustrated in FIG. 3A, the mobile terminal would also reenter a low power sleep mode upon the expiration of a configurable period of time after the satellite transmission, thereby conserving power. Similarly, the sensor device can also reenter a low power sleep mode upon the expiration of a configurable period of time after transmission to the mobile terminal device.

FIG. 3B illustrates a second scenario where the sensor device calls the API, but waits for the mobile terminal device to wake by itself on a scheduled wakeup. This scenario can occur, for example, when there is no provision for a physical wakeup. Once the MT wakes, the MT would then ping the sensor device. The sequence of processing would then follow the scenario illustrated in FIG. 2B.

It should be noted that, in an alternate scenario, the sensor device may be in a low power sleep mode prior to the mobile terminal device waking up at the scheduled time 310. In this scenario, the mobile terminal device would first wake up the sensor device prior to pinging the sensor device.

FIG. 3C illustrates a third scenario where the sensor device sends data in response to a forward data message sent from the mobile terminal device to the sensor device. For example, the mobile terminal can wake on a scheduled wakeup and receive a data packet from the satellite. That packet may contain data for a particular sensor device. The mobile terminal device would then sends the data to the sensor device, and begin to ping the sensor device for a response. In one embodiment, this pinging would last for a configurable period of time (e.g., 5 seconds) before timing out.

If the sensor device receives the data over the RS485 bus from the mobile terminal device, it has a period of time (e.g., 5 seconds) to respond with a message, using the API. If the message is received before the timeout, the mobile terminal can pack the sensor data and transmit the data back over the satellite all in the same wakeup session. This process illustrates a paging process where specific data from a sensor associated with a particular mobile terminal is requested. For example, a customer or operations center can choose to send data to a particular sensor device instructing it to do a specific function, such as perform a measurement (e.g., temperature), and have the sensor device return the results immediately in that paging wakeup session.

Although the mobile terminal device can be configured to ping each sensor device on each wakeup, and can receive data from the sensor devices, it need not transmit that sensor data unless configured to do so. As would be appreciated, the mobile terminal can awaken for many reasons, including scheduled wakeups for position reports and paging, forced wakeups, and other transparent overhead wakeups. Accordingly, various APIs can be defined for use by the sensor device to send data to the mobile terminal device. For example, the set of APIs can include a first API that lets the mobile terminal decide when to send the data over the satellite (e.g., scheduled wakeup), a second API that instructs the mobile terminal to send the data over the satellite immediately (e.g., due to a forced wakeup upon a detected event where sensor data more important than position data), and a third API that instructs the mobile terminal to send the data over the satellite immediately along with position data. In general, these APIs provide flexibility in how a sensor device can use the mobile terminal to transmit data to the centralized facility.

To illustrate this flexibility, consider an application that includes a tire sensor. Here, reports for scheduled wakeups can include relative sensor readings such as a change in mileage from the previous report. If the centralized facility is out of sync with the relative mileage change reports, the centralized facility can also page the sensor device requesting an absolute mileage report. As would be appreciated, a full mileage report would require a significantly greater number of bits as compared to a relative mileage change report. Thus, the full mileage report would take up a greater amount of bandwidth and may be transmitted to the centralized facility without any location information.

In general, the ability to send data from a centralized facility to a sensor device enables significant functionality. For example, a customer can send data to a sensor device from a web interface requesting any type of information, or to configure/reconfigure an individual sensor device. In this context, device configuration can include, but is not limited to, its operating mode (such as master or slave device), baud rate, power level, wake up interval, status requests, sensor parameters, etc. In general, all of the interface network's configurable parameters can be set or changed either over-the-air from the gateway, or through some other interface, such as a wired interface using a configuration terminal.

In addition to enabling bi-directional communications to and from a sensor device, it is a feature of the present invention that the local area network interface can enable system devices to be in a low power sleep mode most of the time, and only transmit for a short duration of time.

In general, the low power sleep mode enables both the mobile terminal and the sensor devices to conserve power. This power conservation enables the mobile terminal and the sensor devices to maximally extend the battery life to a period of years (e.g., 8-10 years). This power conservation creates a large cost savings in reducing the field costs associated with the monitoring and periodic replacement of batteries in the mobile terminal and sensor devices.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A sensor monitoring system at an asset location, comprising:
   a satellite modem;
   a master device that interfaces with said satellite modem for delivery of sensor data to a remote location; and
   a slave device that is coupled to a sensor that is designed to measure a physical quantity based on interaction by said sensor with a physical environment in which said sensor is placed, said slave device also being configured to communicate sensor measurement data to said master device via a wired serial interface for delivery to a remote location using said satellite modem, wherein said slave device includes a controller that controls entry of said slave device into a low power state and waking of said slave device upon an occurrence of an physical event at detected by said sensor.

2. The system of claim 1, wherein said serial interface is a RS-485 interface.

3. The system of claim 1, wherein said master device assigns a wakeup time to said slave device after said slave device completes a synchronization process.

4. The system of claim 1, wherein said master device transmits configuration information to said slave device.

5. The system of claim 4, wherein said configuration information originates at a remote location and is received by said master device via said satellite modem.

6. The system of claim 1, wherein said master device transmits a status request to said slave device.

7. A sensor interface system at an asset location, comprising:
   a slave device having an associated sensor that is designed to measure a physical quantity based on interaction by said associated sensor with a physical environment in which said associated sensor is placed;
   a satellite modem that receives a message from a remote location via a communication satellite, said message including configuration information for said slave device; and
   a master device that interfaces with said satellite modem for delivery of sensor data to said remote location, said master device being configured to communicate with said slave device to deliver said configuration information to said slave device, wherein upon receipt of said configuration information from said master device said slave device reconfigures an operation of said associated sensor.

8. The system of claim 7, further comprising a locating device that is coupled to said satellite modem, said locating device generating information that is used to identify a location of the asset.

9. The system of claim 8, wherein said locating device generates location information that is used, at said remote location, to calculate a location of the asset.

10. The system of claim 7, wherein said master device is integrated in hardware with said satellite modem.

11. The system of claim 7, wherein said master device is on separate hardware from said satellite modem, and communicates with said satellite modem using a hardwired interface.

12. The system of claim 7, wherein said master device transmits a status request to said slave device.

13. A sensor monitoring method in a system having a plurality of slave devices and a master device, said master device being coupled to said plurality of slave device via a shared communication bus, comprising:
   detecting a sensor event by a slave device that is coupled to a sensor;
   signaling, by said slave device, to said master device for said master device to wake from a low power state;
   receiving, by said slave device, a request from said master device;
   sending, by said slave device in response to said request, information regarding said detected sensor event to said master device for delivery by said master device to a remote location via a satellite modem coupled to said master device.

14. The method of claim 13, wherein said sending comprises sending via a serial interface.

15. The method of claim 14, wherein said sending comprises sending via a RS-485 interface.

16. The method of claim 13, wherein said signaling comprises signaling over said shared communication bus in response to said detected event.

* * * * *